Aug. 1, 1933.  F. W. MEYER  1,920,654
DRAWER LOCKING MECHANISM FOR TRUNKS
Filed Feb. 3, 1930 2 Sheets-Sheet 1
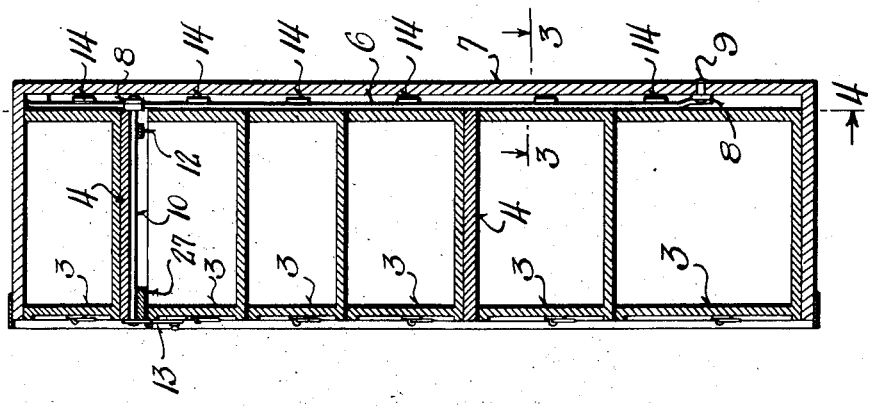

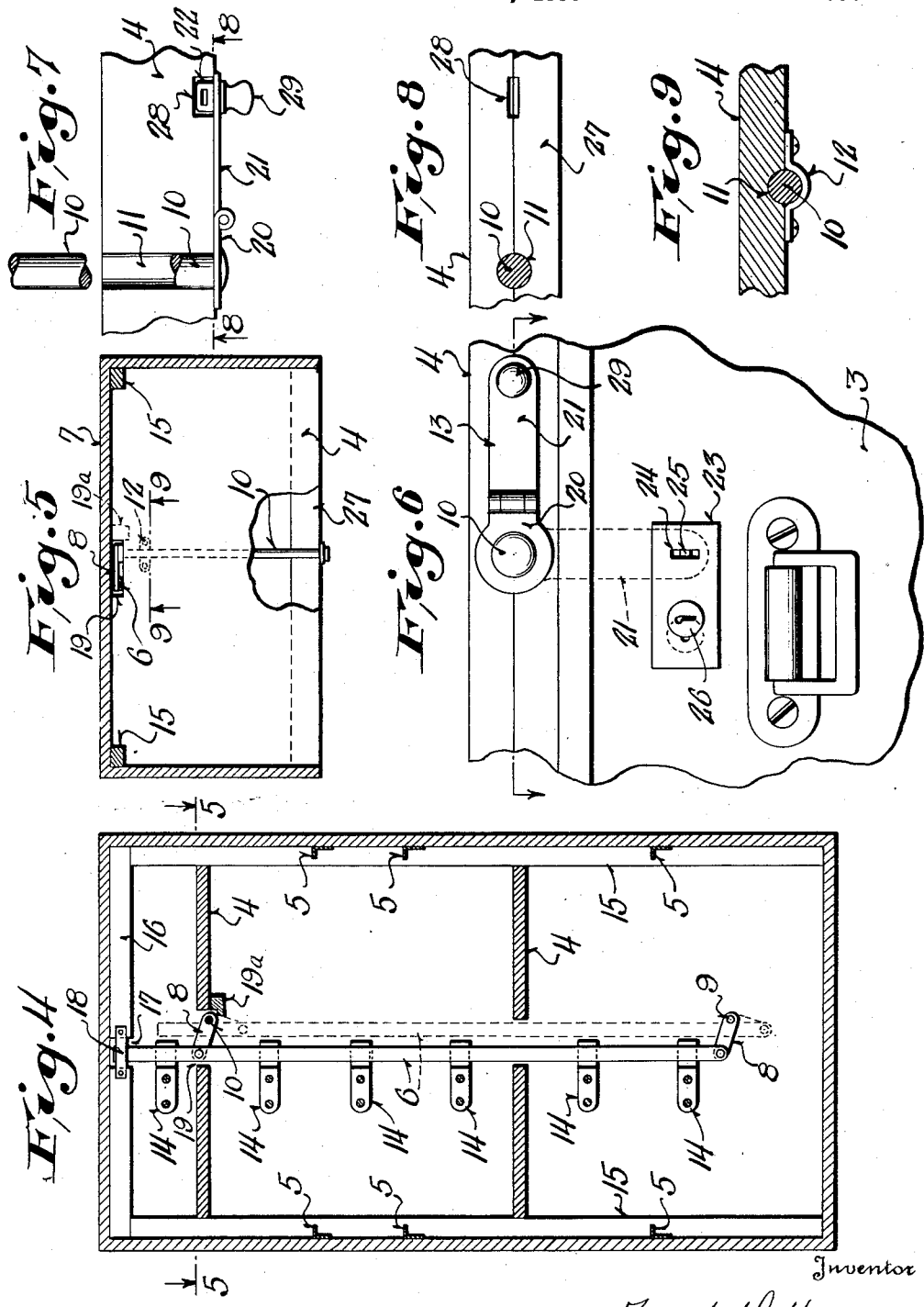

Patented Aug. 1, 1933

1,920,654

UNITED STATES PATENT OFFICE 1,920,654

DRAWER LOCKING MECHANISM FOR TRUNKS

Frank W. Meyer, Oshkosh, Wis., assignor, by mesne assignments, to Oshkosh Trunks, Inc., Oshkosh, Wis., a Corporation of Wisconsin Application February 3, 1930. Serial No. 425,536

5 Claims. (Cl. 45—94)

This invention relates to a drawer locking mechanism for trunks and more particularly for wardrobe trunks.

Heretofore it has been the general practice with respect to drawer locking mechanism for wardrobe trunks to resort to mechanisms in which the actuating means is located between the uppermost drawer of the tier and the top wall of the drawer section of the trunk. This requires that the top portion of the drawer section be made dome-shaped in order to provide a space either to accommodate the actuating mechanism or to allow the operating member to be swung above the uppermost drawer when actuating the mechanism to unlock all of the drawers in the drawer section. Such an arrangement is not applicable to a flat top wardrobe trunk because the top wall of the drawer section is immediately adjacent the upper edges of the top drawer and there is not sufficient space between the two to accommodate the actuating mechanism or to allow the operating member to be swung above the top drawer in unlocking said drawer locking device.

One of the objects of my invention is to connect the actuating mechanism with the movable bar of the drawer locking device between the ends of the bar so that the actuating mechanism may be positioned between any two of the drawers, preferably the upper drawer and the one below, so that the top wall of the drawer section of the trunk may be made flat and thus avoid the necessity of the dome-shaped construction which is more expensive than the flat wall one.

Another object of my invention is to utilize the usual horizontal partition wall between the top drawer and the one below as the support for the actuating mechanism of the drawer locking device, thereby making said wall serve a dual purpose and avoid the necessity of incorporating any other fixed means in the trunk section to serve as a support for said actuating mechanism.

Another object of my invention is to provide the operating member of the actuating mechanism in a form of a crank handle located exterior of the tier of drawers and arranged to be swung from a vertical position overlapping one of the drawers on one side of the partition to a horizontal position in the plane of the partition at which time all of the drawers are unlocked and the handle member is out of the path of movement of the drawers between which it is located.

A further object of my invention is to make this handle member in the form of a hasp so that it may be locked to the front face of the drawer which it overlaps when locking all of the drawers in the trunk through the drawer locking mechanism.

A further object of my invention is to provide a recess or slot at the partition to receive a portion of the hasp when turned in the plane of the partition so as to hold the hasp from accidental movement while the drawers are unlocked.

The invention consists further in the matters hereinafter described and claimed.

In the accompanying drawings—

Fig. 1 is a view looking into a wardrobe trunk of the center-opening type equipped with a drawer locking mechanism of my invention;

Fig. 2 is a vertical sectional view taken on line 2—2 of Fig. 1;

Fig. 3 is an enlarged fragmentary horizontal sectional view taken on line 3—3 of Fig. 2 to show a detail of construction;

Fig. 4 is a vertical sectional view taken on line 4—4 of Fig. 2 at the rear of the drawers to show the locking bar and its mode of operation in simultaneously locking and unlocking all of the drawers;

Fig. 5 is a horizontal sectional view taken on line 5—5 of Fig. 4 with a portion of the partition wall cut away to show the shaft below the same;

Fig. 6 is a front elevational view showing the crank handle member at the outer end of the shaft;

Fig. 7 is a horizontal view taken on line 7—7 of Fig. 6;

Fig. 8 is an elevational view of the front edge of the partition to show the slot or recess therein for the crank handle, said view being taken along line 8—8 of Fig. 7; and Fig. 9 is a vertical sectional view taken on line 9—9 of Fig. 5 to show a detail of construction.

In the drawings, 1, 2 indicate the two hinged together sections of the trunk. The section 2 is the chiffonier section and is provided with a tier of drawers 3, 3, as usual in trunk structures of this general kind. The drawers 3 are slidably supported in a suitable manner in the section 2. As illustrated, section 2 is provided with one or more horizontal partitions 4 which extend the full width and depth of the section to brace and strengthen the same. These partitions are secured to the adjacent walls of the section and are arranged, one between the top or uppermost drawer and the drawer immediately below, as shown in Figs. 1 and 2. The other partition is located farther down the section 2, preferably between the second drawer from the bottom and the one immediately above the same. The partitions provide supports for the drawers immediately above them, the other drawers being supported by angle strips 5, 5 secured to the side walls of the section 2 beneath the bottoms of the respective drawers as shown in Fig. 4.

The drawer locking mechanism of my invention comprises a main locking bar 6, preferably in the form of a relatively flat strip of metal vertically disposed in the section 2 to the rear of the drawers 3 and extending nearly the full height of the trunk so as to simultaneously lock and unlock all the drawers in the actuation of the bar in the manner to be presently described. The bar 6 is mounted on the inside of the rear wall 7 of the section 2 by a pair of links 8, 8, these being disposed, one adjacent the upper end of the bar and the other at or adjacent the lower end of the bar, as shown in Fig. 4. The lower link 8 is pivoted at 9 to the rear wall 7 and has its other end pivoted to the lower end of the bar. The upper link 8 is pivoted at one end to the bar and at its other end fixed to a shaft 10. The shaft 10 is horizontally disposed beneath the upper partition 4, preferably lying in a slot or groove 11 in the under side of the partition as shown in Fig. 9. A strap 12 is employed to support the shaft 10 adjacent its rear end, said strap being secured to the under side of the partition as shown. The shaft 10 extends slightly beyond the front edge of the partition 4 and is there provided with a crank or handle member 13, by means of which the shaft may be turned to impart an oblique movement to the bar 6 when simultaneously locking or unlocking the drawers 3 in the section 2.

Each drawer is provided on its rear wall with a hook 14 to engage around the rear side of the bar 6 when the latter is in drawer locking position as shown in full lines in Figs. 3 and 4. The hooks 14 engage over the bar 6 from the side thereof opposite the links 8, so that the bar, when moved obliquely away from the hooks will release the latter and permit any or all of the drawers to be individually slid into and out of the section 2.

The drawers 3, when in closed position, abut against cleats 15, 15 secured to the section 2 against the inner side of its rear wall 7 at the corners of the section so that the drawers will not contact with the bar 6 to hinder ease of movement thereof. Moreover, these cleats serve to space the rear walls of the drawers a sufficient distance outward from the rear wall 7 so that the hooks 14 may be applied to the drawers and be disposed to be engaged and disengaged by the bar 6 in its movement into and out of drawer locking position, as indicated in the full and dotted lines in Fig. 4. A cleat 16 is secured in the section 2 at the upper end of the rear wall 7 in the plane of the cleats 15 and is provided with a vertical slot or recess 17 to receive the upper end of the bar 6 when the latter is in drawer locking position. A strip of metal 18 is secured to the cleat 16 across the slot 17 to prevent displacement of the bar out of the slot when the bar is in drawer locking position and thus rigidly hold the bar in such position and prevent it from being bent or displaced should an outward pull be exerted on any of the drawers 3 when the latter are locked by the bar.

Both partitions 4, 4 extend the full depth of the section 2 and each is provided in its inner edge with a slot 19 through which the bar 6 extends. Each slot is made long enough to allow for the lateral movement of the bar 6 when the latter is swung into and out of drawer locking position. The slot 19 in the upper partition 4 is made wide enough to accommodate the upper link 8 which is located adjacent said partition. A stop member 19ª is secured either to the upper partition 4, or to the rear wall 7 of the section 2 at the end of the slot 19 adjacent the link so as to limit the lateral swinging movement of the bar 6 when withdrawn from the hooks 14. By this means the partition 4 is relieved of strain when the bar 6 strikes the lug. The crank or handle member 13 is made in two parts, an inner part 20 which is fixed to the outer end of the shaft 10, and an outer part 21 which is hinged to the part 20. The part 21 is provided on its inner side adjacent its outer or free end with an apertured lug 22 through the medium of which the handle member may be locked when in vertical position so as to prevent unauthorized operation of the drawer locking mechanism. In the drawings, I have shown the lock for the handle member in the form of the usual suit-case type. This lock is mounted on the front face of the drawer 3 which is immediately below the upper partition 4. The lock has a casing 23 secured to the front wall of the drawer and in position to be overlapped by the part 21 when the handle member extends vertically downward below the partition as shown by dotted lines in Fig. 6. The casing has a vertical slot 24 to receive the lug 22. The casing is provided with a spring pressed bolt 25 which snaps into the aperture in the lug when the latter is forced into the slot as in locking devices of this general type. The bolt may be withdrawn from the lug by sliding laterally a part 26 in which is a key hole to accommodate a key to lock the bolt 25 against sliding movement when it is desired to lock the handle member to the drawer 3.

When the handle member 13 is released from the bolt 25, the hasp 21 may be swung outward from the casing 23, whereupon the handle member may be turned upward into a horizontal position in which movement the shaft 10 is rotated and the bar 6 is moved away from the hooks 14 to unlock all the drawers. The outer end of the shaft 10 is supported by a cleat 27 which is secured beneath the upper partition 4 along its outer edge. This makes it necessary to lessen the height of the drawer 3 immediately below the partition in order that the cleat 27 may be located between the partition and the drawer. The thickness of the cleat need only be sufficient that the combined vertical dimension of the cleat and the partition at the front face of the same be slightly greater than the over-all width of the handle member 13 so that the latter when in horizontal position will lie between the upper and lower edges of the combined cleat and partition and thus have no parts projecting to interfere with the sliding movement of the drawers on opposite sides of the partition. The cleat and the partition are provided with registering recesses at one side of the shaft 10 to form a slot 28 of a size and shape to snugly receive the lug 22 of the hasp 21 and hold the handle member 13 from accidental movement when lying along the front of the partition as shown in Figs. 6 and 7. The hasp 21 is provided on its outer side at or adjacent its free end with a knob 29 by which the handle member may be readily grasped for swinging it to actuate the drawer locking device.

The drawer locking device of my invention is simple in construction, inexpensive to manufacture and install in a trunk, and effectively serves the purpose for which it is designed. The mechanism is given positive movement when locking as well as when unlocking the drawers, and serves to simultaneously lock and unlock all of them. When in unlocked position, all of the drawers are unlocked and either or all of them may be individually slid into or out of the section 2 without requiring any drawer to remain partially open so as to keep the locking mechanism in drawer unlocking position. Moreover, a single locking bar 6 may be employed and the construction is less complicated than those which utilize a plurality of locking bars which require a special form of link arrangement to move both bars simultaneously. With the shaft 10 supported by one of the partitions 4, the shaft may be located below the top of the drawer section of the trunk a distance equal to the depth of one or more of the drawers and thus the top wall of the trunk section may be made flat and be brought close to the upper edges of the top drawer as no space need be provided between the top of the trunk and the top drawer to accommodate either the shaft or for the swinging movement of the member employed to turn it. The result is that the locking mechanism of my invention may be installed in a flat top trunk which has not been the case with those devices which require a dome-shaped top in order to provide the space necessary to accommodate the actuating mechanism and its actuating member. While my invention is particularly applicable to flat top trunks, it can be installed in dome-shaped trunks which also have partitions between the drawers as one of these partitions may be employed to support the shaft 10, the same as in a flat top trunk. Instead of a partition any other means may be arranged in the section to support the shaft or other member which may be used to actuate the locking mechanism at the rear of the drawers, which locking mechanism in the form shown in the drawings includes the bar 6 and the hooks 14.

The details of construction shown and described may be variously changed and modified without departing from the spirit and scope of my invention.

I claim as my invention:

1. The combination with the drawer section of a trunk having a tier of slidable drawers therein of a locking mechanism arranged in the section to the rear of the drawers for simultaneously locking or unlocking them, a shaft rotatably supported in the section between two of the drawers and connected with the locking mechanism for actuating it, a handle member connected to the outer end of the shaft for turning it, said handle member being accessible and operable at all times from the exterior of the drawers whether locked or unlocked, and means whereby the handle member may be held against accidental movement when in drawer unlocking position.

2. The combination with the drawer section of a trunk having a tier of slidable drawers therein, of a partition secured in the section between two of the drawers, a locking mechanism arranged in the section to the rear of the drawers for simultaneously locking or unlocking them, a shaft supported by the partition and connected with locking mechanism for actuating it, a hasp connected with the outer end of the shaft for turning the same, said partition having a slot therein at one side of the shaft, and a lug on the hasp to be inserted in said slot when the hasp is in drawer unlocking position.

3. The combination with the drawer section of a trunk having a tier of slidable drawers therein, of a partition secured in the section between two of the drawers, a locking mechanism arranged in the section to the rear of the drawers for simultaneously locking or unlocking them, a shaft supported by the partition and connected with locking mechanism for actuating it, a hasp directly connected with the outer end of the shaft for turning same, said hasp lying along the front and within the confines of the partition when in drawer unlocking position and extending over the front of a drawer on one side of the partition when in drawer locking position whereby the hasp may be locked to said drawer through a locking device carried thereby.

4. The combination with the drawer section of a trunk having a tier of slidable drawers therein, of at least one partition secured in the section between two of the drawers, a combined filling and supporting cleat disposed below said partition and above the drawer immediately below said partition, locking members carried by the drawers at the rear of the same, a bar arranged in the section to the rear of the drawers, links pivoted to said bar whereby the latter may be swung into and out of engagement with said members, a shaft extending in between the partition and the filling and supporting cleat and connected with the bar through one of the links for actuating the bar, means coacting with the shaft and the partition for supporting the shaft for rotation, said filling and said supporting cleat also aiding in the support of the shaft, and means at the outer end of the shaft for turning it.

5. In a wardrobe trunk, an upright section having connected top, bottom, side and rear walls forming a container for a tier of drawers which are slidably mounted in the section, the top wall of the section being substantially flat and forming a closure for the uppermost drawer of the tier, locking elements on the drawers at the rear of the same, a locking mechanism mounted in the section to the rear of the drawers and movable into and out of locking engagement with said elements for simultaneously locking and unlocking all of the drawers, a shaft rotatably supported in the section between two of the drawers and connected with the locking mechanism for actuating the same on turning the shaft, and an operating member connected with the outer end of the shaft for turning it, said operating member being accessible and operable at all times from the exterior of the drawers whether locked or unlocked.

FRANK W. MEYER.